Dec. 18, 1951 W. L. MORRISON, JR 2,579,154
FLEXIBLE MAGNETIC POWER TAKE-OFF
Filed Sept. 21, 1949 2 SHEETS—SHEET 1
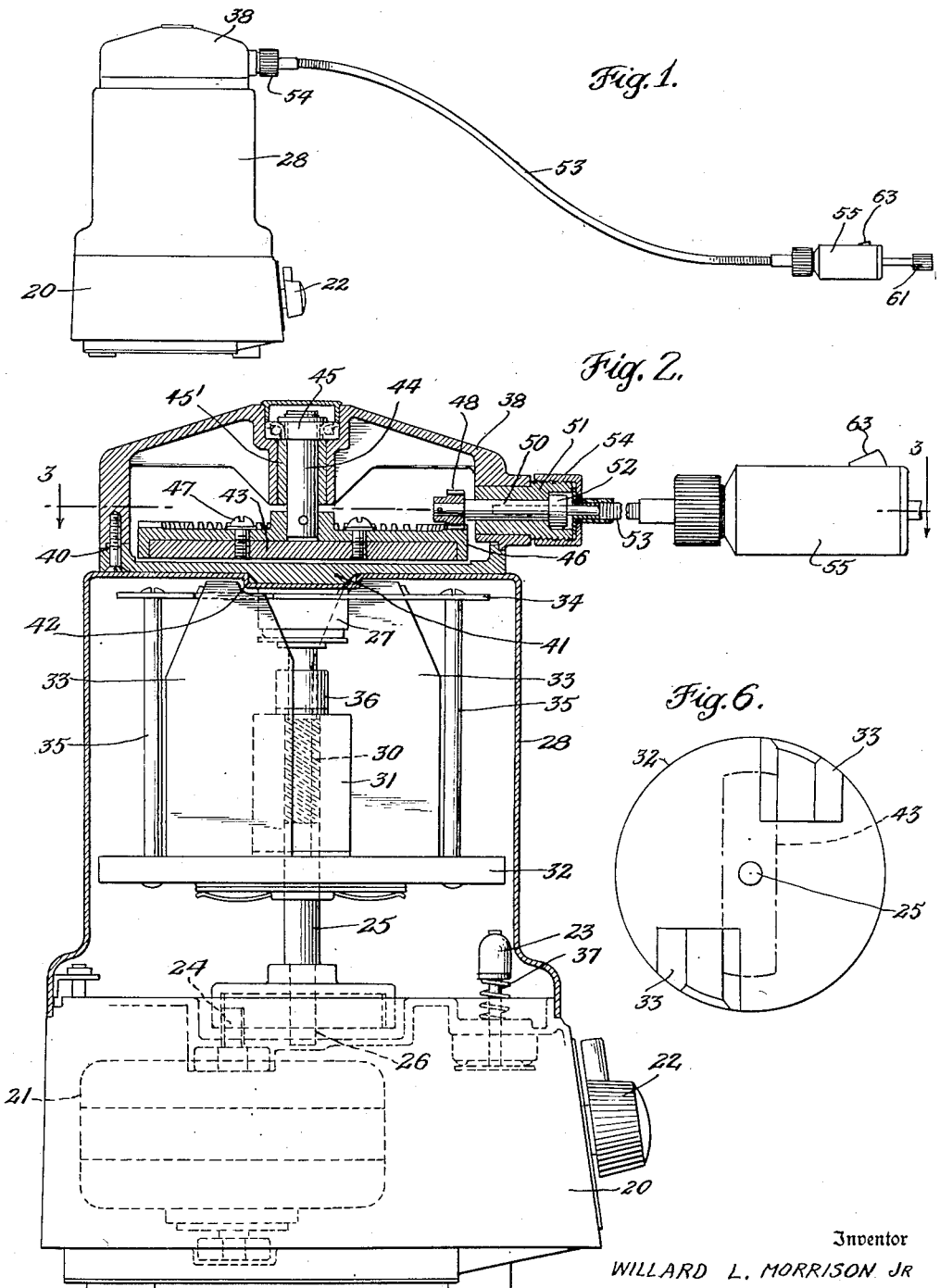
Inventor
WILLARD L. MORRISON JR
By
Attorneys Dec. 18, 1951         W. L. MORRISON, JR         2,579,154

FLEXIBLE MAGNETIC POWER TAKE-OFF

Filed Sept. 21, 1949         2 SHEETS—SHEET 2

Inventor

WILLARD L. MORRISON JR.

By

Attorneys

Patented Dec. 18, 1951

2,579,154

UNITED STATES PATENT OFFICE 2,579,154

FLEXIBLE MAGNETIC POWER TAKE-OFF

Willard L. Morrison, Jr., Akron, Ohio, assignor to Magnetic Power, Inc., Wilmington, Del., a corporation of Delaware Application September 21, 1949, Serial No. 116,915

5 Claims. (Cl. 172—284)

The present invention relates to power take-offs for magnetic power devices of the character which operate stirrers, mixers and small tools and appliances.

A purpose of the invention is to obtain power preferably at high speed from a magnetic power unit at a remote point.

A further purpose is to take off power through a flexible shaft and avoid damage to the flexible shaft by overloading or by undue bending or angularity.

A further purpose is to increase the safety of operation of small tools and appliances.

A further purpose is to take off power from a magnetic power unit through a flexible shaft and to provide for automatic overload release which will avoid damage to the shaft, to the motor, to the user and to the appliances employed.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a side elevation of the magnetic power unit and power take-off in accordance with the invention.

Figure 2 is a fragmentary enlargement of Figure 1 showing the upper portion of the casing and the power take-off unit in central vertical section.

Figure 6 is a diagrammatic top plan view of the power unit showing the relation of the keeper to the magnets during operation of the device.

In the drawings like numerals refer to like parts.

Figure 3:
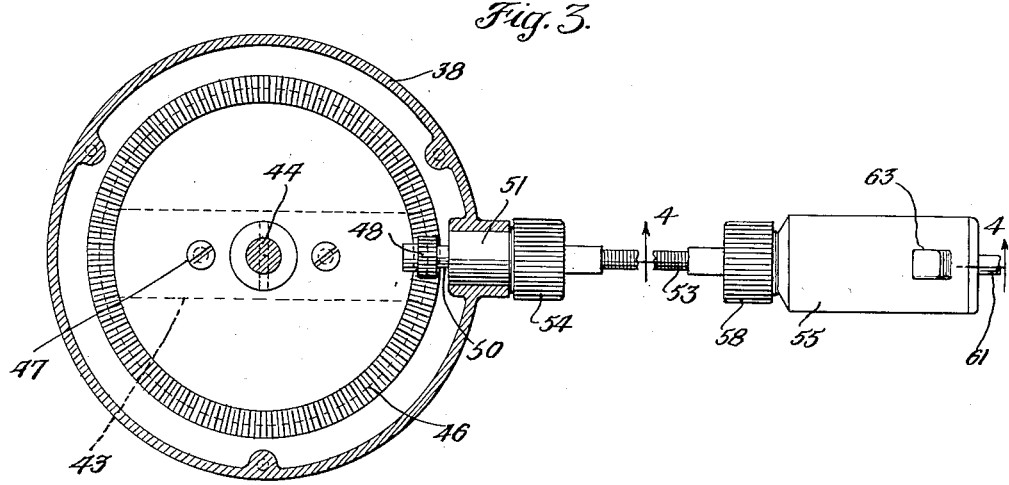
Figure 3 is a section of Figure 2 on the line 3—3.
Figure 4:
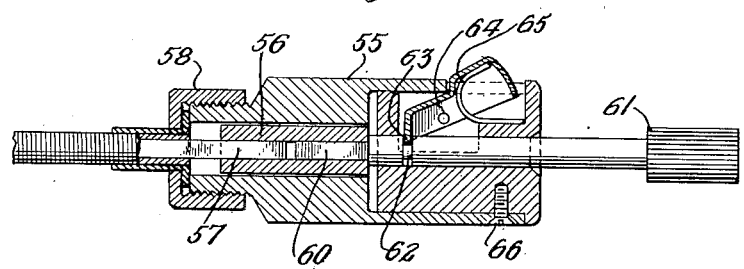
Figure 4 is a section of Figure 3 on the line 4—4.
Figure 5:
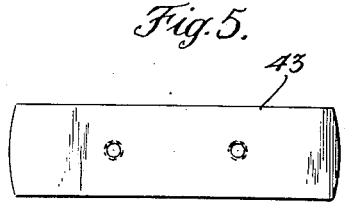
Figure 5 is a detail plan view of the keeper.

Magnetic power units have been developed in which a turning magnet magnetically couples with a magnet keeper and drives the keeper, as for example shown in Jerome L. Murray U. S. patent application Serial No. 771,176, filed August 29, 1947, for Mixer and Process for Home Use and the like. Efforts have been made to take off power from the magnetic power unit through a flexible shaft to drive a remotely located stirrer or mixer or to drive some small tool or appliance. Difficulty has been encountered in some cases through the fact that the torque transmitted to the flexible shaft has been considerably in excess of that which the flexible shaft would transmit, resulting in damage to the flexible shaft. The direction of power take-off from the power take-off unit has been unfavorable for many types of work, resulting in the tendency to kink and damage the flexible shaft. Also the speed obtained by direct drive of the flexible shaft at the same speed as the magnet has been insufficient.

In accordance with the invention the torque limit at which the keeper will slip with respect to the magnet is set by predetermining the size and location of the keeper to provide a maximum torque value which is below the value at which the flexible shaft will be in danger of failure. Thus if by reason of jamming of the tool or any other similar cause a loss is applied which might damage the flexible shaft, the shaft is protected by slippage of the keeper with respect to the magnet.

In some cases the tool may have a safe torque limit below that of the flexible shaft, and in this case the slippage torque limit of the keeper should be set at such lower torque limit. For example in the case of a saw, sander, drill, countersink, tap or similar tool, the stalling torque or binding torque which might endanger breakage of the tool, or the torque which might correspond with danger to the individual, as for example winding of the clothing of the individual in the tool or engaging of the tool with the body of the individual should be determined and the slippage torque of the keeper should be set at a lower value. This not only serves the purpose of protecting the user against harm and also protecting the tool and the flexible shaft against damage, but it also protects the motor since the motor continues to turn and does not stall notwithstanding that the keeper slips instead of turning.

In accordance with the invention, the keeper coupling relationship with the magnet, the keeper size and the material of the keeper are all or any preferably changed to a value which will assure the desired slippage torque. The keeper by turning drives its ring gear which drives a transverse gear turning the flexible shaft. In this way a 90° bend is avoided which might otherwise be required in the flexible shaft.

The keeper is preferably suspended on a bearing from above so that the bearing does not interfere with close coupling between the keeper and the magnet, and so that the bearing will permit slight adjustment in the axis as permitted by the play in the bearing. This subject matter is contained in my application Serial No. 116,913 filed September 21, 1949, for Magnetic Power Device.

It will be evident that the tool on the end of the flexible shaft may be of any desired character, such as a stirrer or mixer, a grinder, buffer, saw, routing cutter, drill, tap, countersink or the like.

The magnetic power unit of the invention comprises a base housing 20 supporting a vertical electric motor 21 controlled by a switch 22 and cut off by a switch 23. The motor 21 is connected by gearing 24 with a rotor shaft 25 turning in a bottom bearing 26 in the housing and in a top bearing 27 on the under side of the top of a non-magnetic casing 28 surrounding the rotor and supported on the bottom housing. The rotor shaft 25 has threads 30 in the direction which will raise the rotor when the shaft turns forwardly, and the threads 30 engage and freely run with the threads on nut 31 surrounding the rotor shaft. The nut 31 interconnects with a rotor base 32 preferably of magnetically susceptible material which supports upwardly directed permanent magnets 33. At the top of the rotor a non-magnetic plate 34, having an opening to clear top bearing 27, supports the magnets and is held to the rotor base by studs 35.

The rotor is limited in upward motion by a collar 36 on the rotor shaft engaging nut 31, and is limited in downward motion by rotor base 32 engaging cut-off switch 23 against the action of switch compression spring 37. When the rotor is in upper position it creates a turning magnetic field close coupled to the keeper. When the rotor is in the lower position the keeper can be readily removed.

It will be understood that any suitable magnetic power unit creating a turning magnetic field may be used.

Resting on the casing 28 is a suitably non-magnetic power take-off housing 38 desirably separable and joined together by screws 40. In the middle of the bottom of the housing is a centering bulge 41 which extends into a recess 42 in the center of the top of the power unit. This serves to keep the power take-off unit from being displaced to one side.

A magnetically susceptible keeper 43 close coupled with the magnets of the rotor is rotatably mounted on a vertical axis on shaft 44 turning on a journal and thrust bearing 45 at the top of the housing, and a sleeve bearing 45' below. The shaft is engaged with a large gear 46 coaxial with the keeper and having upwardly directed teeth. The gear is connected to the keeper by screws 47.

The suspension of the keeper and the large gear from a bearing located above these parts permits slight readjustments of the axis as the keeper and gear turn under the action of the turning magnetic field. A transverse pinion 48 intermeshes with the large gear and is mounted on a shaft 50 journalling at 51 in the housing. The shaft 50 has a squared socket 52 directed readily outwardly, which is connected to a flexible shaft 53, having a suitable cooperating squared end, by a flexible shaft connector 54 of any well known character, here shown as including a threaded shank and nut.

The flexible shaft at its remote end is provided with any desired character of chuck 55, here shown as consisting of a connector shaft 56 having a squared opening which receives a squared end 57 on the flexible shaft, the flexible shaft being held to the chuck by a suitable threaded connector 58. The opposite end of the squared connector shaft 56 receives the squared end 60 of a tool 61 which may be of any suitable character such as a drill, tap, milling cutter, routing tool, brush, burnisher or the like. An annular slot 62 in the tool desirably receives a latch 63 in the chuck which is mounted on a fixed pivot 64 and urged by a spring 65 toward latching position.

The chuck is shown as consisting of two parts joined by a screw 66.

In operation it will be evident that the size and coupling of the keeper will be designed with respect to the strength of the magnet to provide a slippage torque which will be safe for the flexible shaft and the tool.

As the magnet turns the rotating magnetic field turns the keeper and the turning keeper carries with it the ring gear which turns the transverse gear, driving the flexible shaft and ultimately driving the tool at the end of the shaft.

While reference has been made herein to a permanent magnet or magnets supported on a rotor for creating the turning magnetic field, questions of whether the magnetic driving field is created by a permanent magnet, an electromagnet or some combination of the same, or by magnets on a rotor or a magnet which forms the entire rotor are not critical in the present invention, and it will be understood that variations in these features may be employed if desired.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. A magnetic power unit having a turning magnet which produces a turning magnetic field, and having a housing provided with an upwardly directed flat top having a recess at the center of the upper portion of the unit and a power take off unit resting on top of the magnetic power unit having a housing provided with a centering bulge which extends into the recess, and having a turnable magnet keeper, the force between the power unit and the power take-off unit holding the centering bulge in the recess and preventing displacement of the power unit on the flat top.

2. In a magnetic power device, a power unit including a magnet turning on a vertical axis and having a housing provided with a flat top surrounding the magnet, a power take-off housing resting on the flat top of the power unit housing, a magnet keeper journalled on a vertical axis in the power take-off housing and turning with the magnet, a first gear mounted on the side of the keeper remote from the power unit and turning with the keeper, a transverse gear intermeshing with the first gear and a flexible shaft driven by the transverse gear.

3. In a magnetic power device, a magnetic power unit including a magnet turning on a vertical axis and a housing having a flat top surrounding the magnet, a power take-off housing positioned on the flat top and having a bottom portion supporting the power take-off housing from the top of the power unit housing and closing the bottom of the power take-off, a magnet keeper journalled on a vertical axis in the power take-off housing above the bottom thereof, magnetically coupled to the magnet, turning with the magnet and slipping with respect to the magnet beyond a torque limit, a first gear mounted on the upper side of the magnet keeper and turning with the keeper, a second gear journalled in the housing transverse to the first gear and intermeshed therewith and a flexible shaft turned by the transverse gear and having a torque limit which is higher than the torque limit of the magnet and keeper.

4. In a power take-off unit for a magnetic power unit comprising a housing having a generally flat closed bottom, a magnet keeper journalled in the housing and rotatable in close proximity to the bottom, a first gear mounted on the side of the keeper remote from the bottom of the housing and turning with the keeper, a transverse gear journalled in the housing and intermeshing with the first gear and a flexible shaft connected to and driven by the transverse gear.

5. A magnetic power take-off comprising a housing having a generally flat closed bottom, a bearing inside the housing toward the top and at the center thereof, a shaft supported in the bearing and extending below the same, a keeper on the lower end of the shaft adjacent the inside of the bottom and adapted to be magnetically coupled with a turning magnet, a first gear of annular shape having a flange engaging the ends of the keeper, having a web extending inwardly along the keeper and having teeth upwardly directed at the circumference, a transverse gear journalled in the housing and intermeshing with the upwardly directed teeth on the first gear and a flexible shaft driven by the transverse gear.

WILLARD L. MORRISON, Jr.

REFERENCES CITED

The following references are of record in the file of this patent:

UNITED STATES PATENTS

| Number | Name | Date |
|---|---|---|
| 2,225,209 | Cassels | Dec. 17, 1940 |
| 2,356,784 | Graham | Aug. 29, 1944 |
| 2,447,130 | Matulaitis | Aug. 17, 1948 |
| 2,452,945 | McCabe | Nov. 2, 1948 |
| 2,479,986 | Thomas | Aug. 23, 1949 |